(No Model.)

R. S. WARING
SUBMARINE ELECTRIC CABLE.

No. 268,059. Patented Nov. 28, 1882.

Witnesses
C. L. Parker
R. H. Whittlesey

Inventor
Richard S. Waring
by George H. Christy
his Atty

UNITED STATES PATENT OFFICE.

RICHARD S. WARING, OF PITTSBURG, PENNSYLVANIA.

SUBMARINE ELECTRIC CABLE.

SPECIFICATION forming part of Letters Patent No. 268,059, dated November 28, 1882.

Application filed April 10, 1882. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Submarine Electric Cables; and I do hereby declare the following to be a full, clear, concise, and exact description thereof, reference being had to the accompanying drawings, making a part of this specification, in which—like letters indicating like parts—

Figure 1:
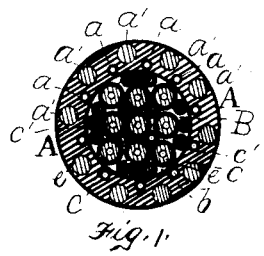
Figure 2:
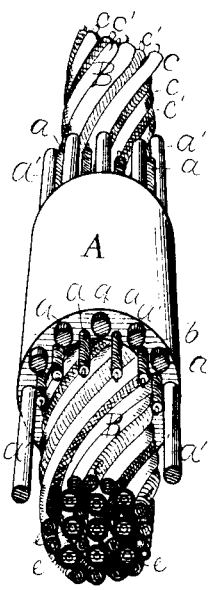
Figure 3:
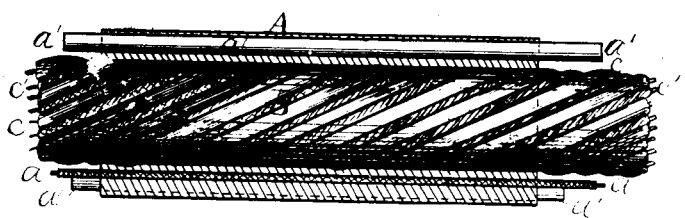

Figure 1 is a transverse sectional view of my improved lead-covered submarine electric cable. Fig. 2 is a perspective view of the same; and Fig. 3 is a longitudinal sectional view, the conductors being shown in elevation.

My invention relates to lead-covered electric cables, designed more particularly for use under water. The advantage secured by embedding two or more electric-circuit wires in lead is well understood, especially in preventing induction.

The purpose of my invention is to adapt cables of this class for use under water, particularly in places exposed to tides and currents, or to unusual tensile strains; and this I do by embedding in the lead covering a series of steel or iron wires, by preference larger than and surrounding or lying outside of the conducting-wires, the wires being arranged and the lead covering formed as hereinafter more fully described and claimed.

In the drawings, A represents a tubular or pipe-like body of lead, in the body of which, near its inner surface, are embedded and covered any desired number of insulated electric-circuit conductors, $a$, preferably of copper, having the usual or any suitable insulating-covering. In the same body of lead, but nearer the outer surface, are also embedded any desired number of steel or iron wires, $a'$. These wires $a'$ alternate with and are larger than the conducting-wires. Extending outward radially beyond the circle of conducting-wires, they prevent wearing away of the soft-lead covering so as to expose, uncover, and injure the conducting-wires. A cable laid in water subject to motion from tides or currents may be moved thereby, and, rubbing against rocks or sharp gravel-stones, the lead covering will be worn away rapidly and the conducting-wires be injured unless protected. Such protection is afforded by the wires $a'$, which take wear of this kind, as well as more violent abrasions from floating ice, drift, or boats, to which the cable may be exposed in comparatively shallow water. The wires $a'$ also increase the tensile strength of the cable, and thereby adapt it for laying in deep water, where it may be subjected to longitudinal strain, both in the operation of laying and also when laid on an uneven or rocky bed. The wires $a'$, being covered by the lead, will be protected from corrosion, and will also be bound together, so as to afford their united strength to sustain longitudinal strain, and also to resist the wearing away of the lead covering from the conducting-wires.

The lead covering may be applied to the wires $a\ a'$ simultaneously and continuously by means of a lead-press having a tubular core with suitable openings for passing the wires through it in the desired relationship to and through the die where the lead is applied. In this way the cable may be made of any desired length without breaks or joints, and, if desired, it may be laid as it is delivered from the lead-press, the cable being formed complete at one operation.

I prefer to make the lead covering A of tubular form, having a central longitudinal passage, $b$, within which may be inclosed one or more electric conductors. I have shown this passage filled by a compound cable, B, composed of a number of insulated conducting-wires of different sizes twisted together for the purpose of adding to their flexibility, compactness, and tensile strength. By using wires of different sizes I also increase the compactness and smoothness of surface of the whole mass; also, by coating some of these insulated wires separately with a lead covering I secure practically continuous metallic conductors running through the cable and forming, by mutual contact with the lead body A, electrical connection for escape of leakage and static charge from the interior wires.

In preparing such cable, the lead-covered wires $c$ may be taken for the larger and those without lead covering, $c'$, be taken for the smaller wires, all being first covered with insulating material $e$, in the usual or any suitable way. The number of small wires $c'$ employed is chosen with reference to filling as closely as possible the spaces between the larger ones, giving thereby a comparatively smooth round surface to the whole when twisted, and also a close or compact interior. Such spaces as may be left should be filled air-tight with some compound or preservative to exclude air and moisture from the interior of the cable.

By twisting the inner compound conductor, B, I not only secure greater compactness and strength, but also a considerable degree of longitudinal elasticity, so that it may yield, along with the lead covering A, under tensile strain, and thus permit such strain to fall upon the strengthening and protecting wires $a'$.

This cable is designed more especially for laying in streams, bays, and along coast-lines, where it may be subjected to considerable motion; and the improvements described are especially adapted to prevent injuries to which it may be exposed in such use. The dangers from rubbing on rocks or in sharp gravel and from boats, floating ice, drift, &c., are especially hazardous to cables laid in streams. By the improvements described herein it is thought that such dangers are practically obviated.

I do not claim herein, broadly, an electric cable having a lead body with insulated conductors in the center of such body, and also at intervals surrounding or around such center, all such conductors being covered and protected by the lead, as a conductor having such features of construction, broadly considered, will form the subject-matter of a separate application for patent.

I claim herein as my invention—

1. An electric cable having insulated electric conducting-wires embedded in and covered by a body of lead, and a series of hard-metal protecting-wires, also embedded in the lead outside of the conducting-wires, substantially as and for the purposes set forth.

2. An electric cable having a tubular lead body, A, a compound conductor, B, filling its central passage, such conductor being composed of wires of different size, a part being lead-covered, and all being twisted together, as described, insulated conductors $a$, embedded in the body of lead, and strengthening and protecting wires $a'$, embedded in the lead outside of the wires $a$, substantially as set forth.

3. An electric cable having a tubular body of lead, a series of insulated conductors imbedded within the lead, near the inner surface of the tubular body, and a series of hard-metal wires alternating in arrangement with the conducting-wires, and embedded within the lead, near the outer surface of the tubular body, substantially as set forth.

4. An electric cable having a tubular lead body, and a compound conductor filling the tubular passage, such conductor being composed of separately-insulated wires, a part of which are also covered exteriorly with an electric conducting material, and all being twisted together, substantially as set forth.

In testimony whereof I have hereunto set my hand.

RICHARD S. WARING.

Witnesses:
R. H. WHITTLESEY,
C. L. PARKER.